INVENTOR.
HERBERT LANGER
BY Emery, Booth, Miller, + Townsend
ATTORNEYS

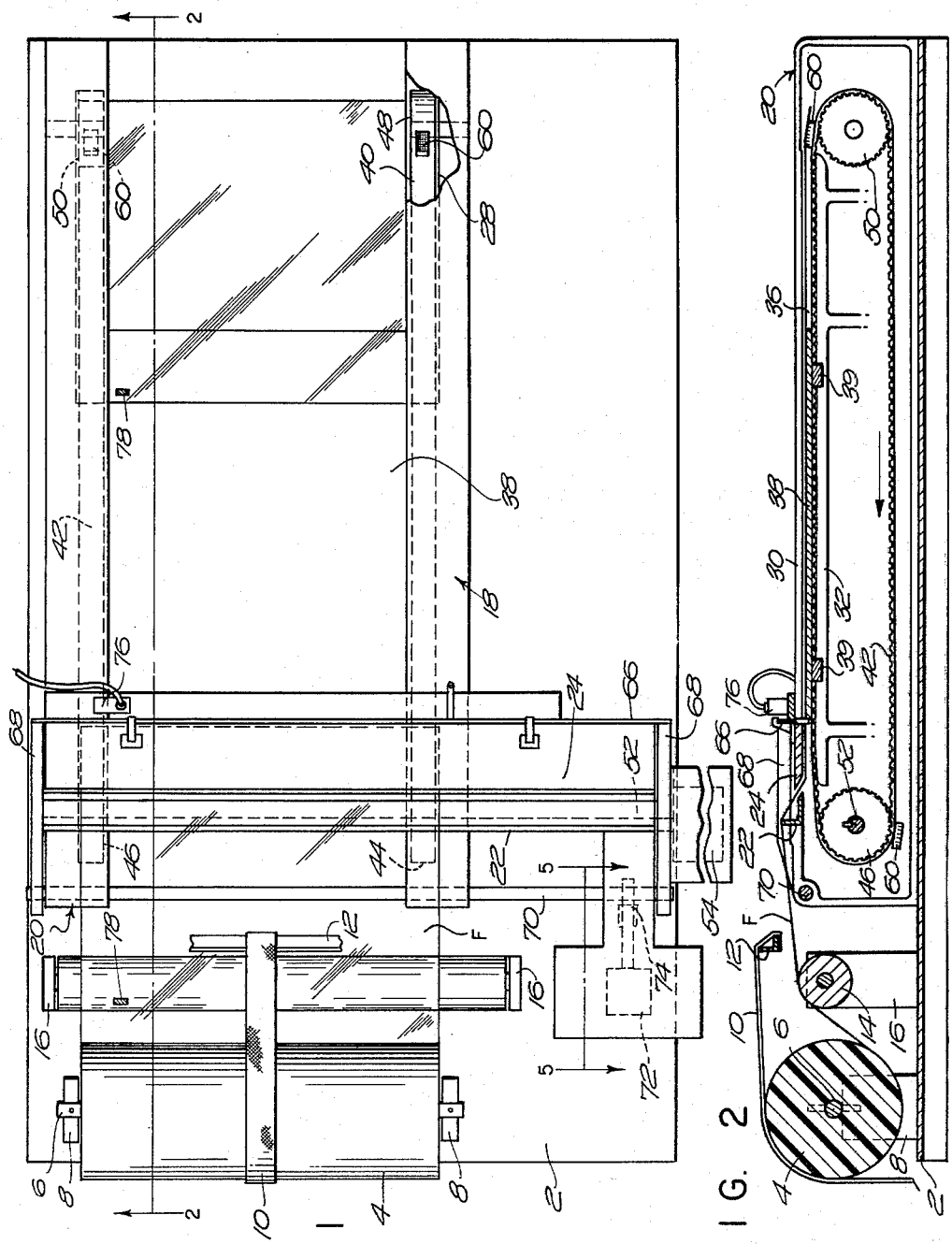

United States Patent Office 3,177,746
Patented Apr. 13, 1965

3,177,746
FILM DISPENSING METHOD AND APPARATUS HAVING GRIPPER MEANS TO PULL THE FILM ACROSS A CUTTING STATION
Herbert Langer, 94 Carroll St., Manchester, N.H.
Filed Apr. 10, 1961, Ser. No. 102,042
8 Claims. (Cl. 83—18)

This invention relates to dispensing flexible films and sheets, and more particularly to method and means for cutting and serving lengths of flexible films and sheets which are of extremely light, thin and limp character.

In the dispensing of films and sheets such as here concerned, the material is supplied from a roll to a track or guide and advanced along that past a cutting station at which it is severed as by a knife into measured lengths, which cut lengths are then further advanced for manipulation in manner and by means not pertinent hereto.

The conventional film handling machines employ belts, rollers and the like means for engaging and moving the film along the track, and their mode of operation is by such means to push the film along the track and in particular through the cutting station. This process of advancing by pushing the film can be utilized when the film has a body or stiffness whereby it will lie flat on the track ahead of the pushing means, whereby it will support itself across the gap or opening provided in the track for the cutter means, and whereby it will resist the cutter at said opening in a way to enable the cutter to shear the film.

However, the prior machines were not designed for, and are not suited for use with, films of the type with which this invention is concerned.

The films with which the present apparatus is for use may be described as extremely light, thin, and flexible, and so limp. They are inelastic and so can be distorted or stretched, but they are also tough, and resist tearing. In addition they have a skin or surface so smooth as to adhere readily to other surfaces, and also collect electrostatic charges. Examples of such films are polyethylene, vinylidine chloride and polypropylene.

Films which combine the above properties cannot be handled successfully, in the usual mode of the conventional dispensing machines. They will stick, sag, and wrinkle on advance along the machine track to the cutter, and further to the delivery point, when that is sought to be accomplished by pushing. And they will give or yield under the impact of the cutter that having the effect of increasing their toughness or resistance to shearing. This because the films are not tensioned, as by supporting them at two spaced points, or by pulling while also adhering the films.

Under this invention the foregoing difficulties are overcome by engaging the film at its leading edge, and drawing or pulling it through the apparatus, including particularly the line of the cut. In this pulling advance the film is engaged by one or more gripping means, tensioned between them and the roll or other continuous film supply, and then drawn along the track through the cutting station. The film is then held tensioned between the pulling means and the braked supply while the cutter is actuated to sever selected lengths of the film. Following each cut, the gripping means are actuated both to advance or draw off the cut length, as to a delivery or other point or station, and to engage at its new leading edge the uncut or continuous film, for pulling that through the cutting station, and in drawing off the severed length, that is tensioned to remove any wrinkles as may have been picked up by the film, and to prevent new ones from forming before its delivery.

As above indicated, the novel advancing-by-pulling which the invention affords eliminates the bunching and wrinkling which was formerly experienced. By maintaining it under tension at and with support both ahead of and behind the region or plane of the cut, the film is enabled successfully to be cut or severed by the invention apparatus and the further tensioning of the severed film length assures that it will deliver in substantially unwrinkled condition.

In the accompanying drawings:

FIG. 1 is a top plan view of the apparatus of the instant invention shown as positioned at the end of an operating cycle and with parts broken away;

FIG. 2 is a vertical section along lines 2—2 of FIG. 1;

Figure 3:
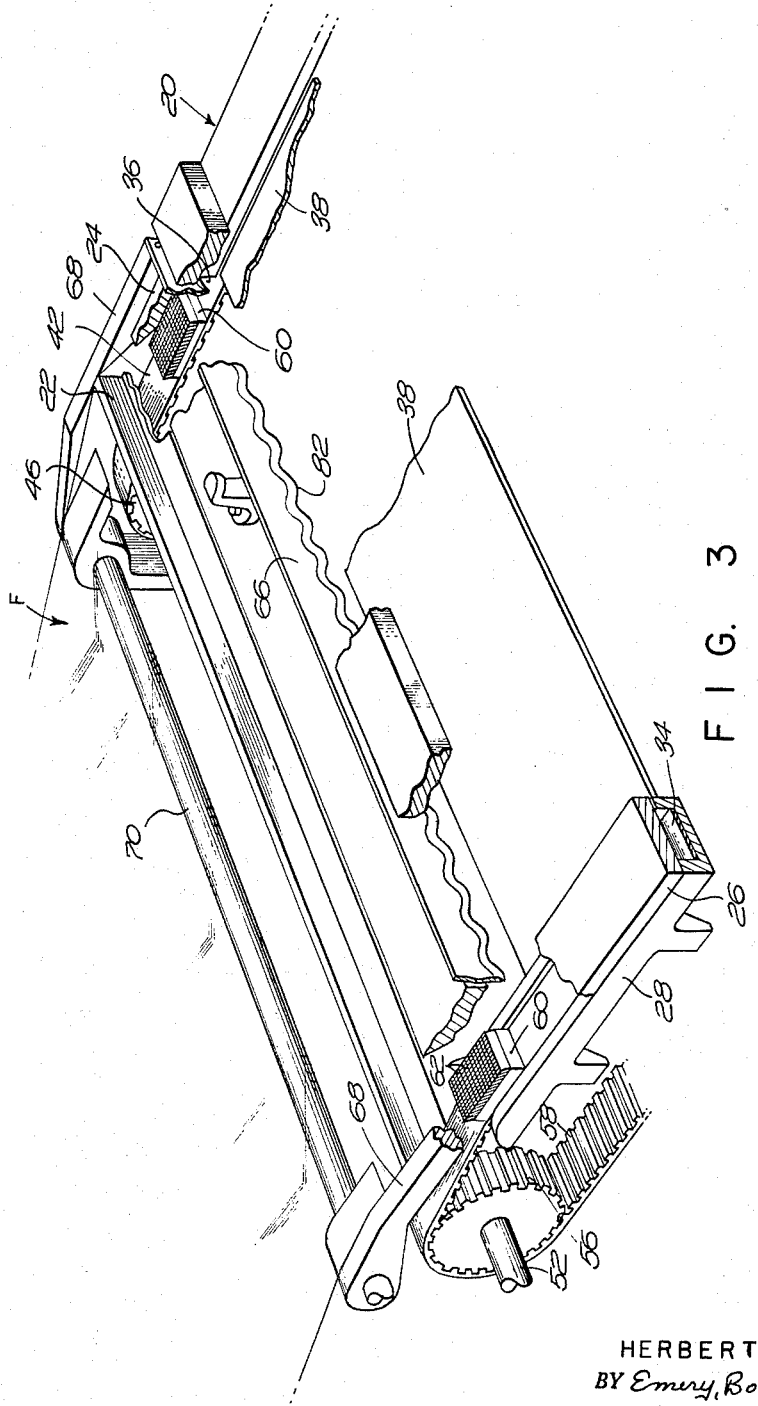
FIG. 3 is a perspective view of a portion of the apparatus with parts broken away.

In the exemplary forms shown in the drawings, my apparatus may be supported on any convenient base or platform 2, FIG. 1. The usual roll 4 for carrying a long or continuous length of the film F, has an axle 6 rotatably supported on the uprights 8, 8 for supply of the film to one end and lengthwise of the apparatus. Any desired or suitable means may be utilized for braking the roll, that being exemplified herein by a flexible belt or the like 10 brought or laid over the roll from one supported end 12 and whose frictional engagement with the roll may be controlled by attaching to its free end desired weights, not shown.

At the entry end of the machine is a transverse idler roll 14 over which the film F is first passed, which roll is longer than the film is wide, and is rotatably mounted on supports 16, 16.

Beyond the idler roll 14 and running lengthwise of the apparatus are a pair of right and left side supporting plate or box assemblies 18, 20. At the forward end of and spanning between these side supports 18, 20 are a pair of under and over guide means 22, 24 between which the film is seen to be passed or threaded. These under and over guide means 22, 24 are conveniently and herein an angle iron and a plate respectively. The plate, and that side of the angle iron to which it is juxtaposed, will be understood to have their adjacent faces shaped and spaced for the desired confinement and also free running of the film. The below engaging iron 22 is also higher than the plate 24, such that in its tensioned passage through the apparatus the film is pressed upwardly against the under face of that above engaging guide 24, as clearly shown in FIG. 2.

Overlying guide plate 24 and mounted on the side assemblies 18, 20 are pairs of over and under or upper and lower guide tracks or plates 26, 28 and 30, 32 which extend longitudinally or rearwardly for a distance to accommodate any desired severed or measured film, sheet or strip length, and which are of a width or extend inwardly to overlap the side margins of the film as shown in FIG. 1. The right upper and lower guide plates 26, 28 and the left upper and lower guide plates 30, 32 are, of course, parallel with one another, and they are spaced to define therebetween channels 34, 36 of a width to accommodate the film F and of a height to receive as hereinafter described the means for gripping and advancing the film. The trailing edges of the upper guide plates 26, 30 are seen also to be spaced ahead of the transverse plate 24 by a distance accommodating the stroke of the cutter means later to be described. It may be mentioned at this point also that the described arrangement provides, by the under face of plate 24 against which the film is tensioned, bearing support of the film across its full width at one side of the cut or cutter. Further, and beginning just beyond the cutter, or gap left therefor, the film may be supported also from below, as by the plate 38, FIGS. 1 and 2, which is seen to be aligned with the channels 34, 36 and to extend laterally between and for support from, as on brackets 39, the aforementioned lower guide plates 28, 32.

Figure 4:
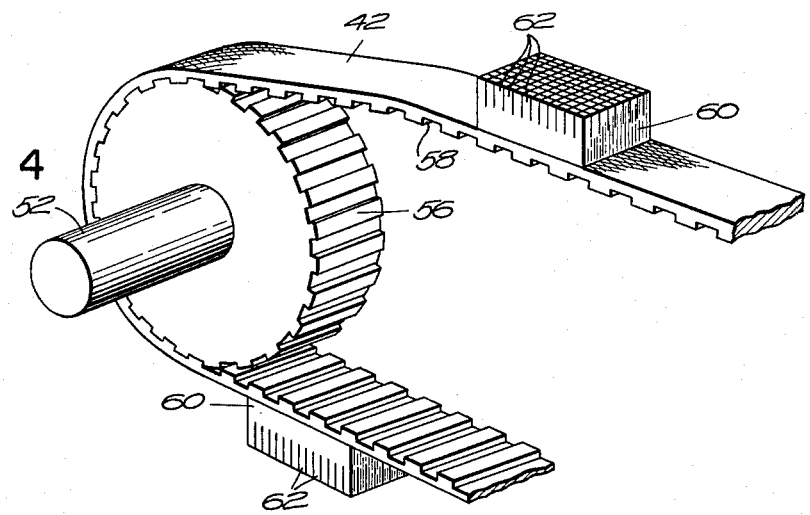
FIG. 4 is a perspective detail of the film gripping and advancing means.

The invention means for gripping and advancing the leading edge of the film are herein shown to comprise a pair of endless webs or belts 40, 42 wound around pulley pairs 44, 46 and 48, 50 which former are mounted on shaft 52 journaled in side plates 18, 20, and which latter are supported from the side plates and arranged so that the upper belt runs extend over the surfaces of the lower guide plates 28, 32. The belts may be driven in any convenient manner as herein by a motor 54 turning the shaft 52 on which is carried one transverse set of the pulleys. To assure their secure or non-slip engagement, the pulleys and belts may be provided with interfitting teeth or ribs and recesses 56, 58, FIG. 4.

The invention film engaging and advancing means further comprise one or more seizing or gripping elements 60, removably secured to the belts 40, 42 and positioned thereon as desired in respect both to longitudinal spacing and to lateral juxtaposition. The grippers 60 are herein shown to comprise rectangular blocks of rubber or the like flexible resilient material the blocks being of a similar width as the belts 40, 42 and having a height slightly greater than that of the channels 34, 36 whereby the grippers are slightly squeezed or compressed on passing through said channels 34, 36. To facilitate that, the channels may be made slightly flaring at the entrances as herein by a downward inclining of the ends of the lower guide plates 28, 32.

In accordance with the invention, the upper halves of the grippers 60 are cut vertically along closely spaced, right angularly intersecting, longitudinal and lateral lines to define said gripper upper halves as a set or series of square-sectioned vertical or upstanding segments or fingers 62. The fingers 62 will be understood to bend rearwardly when subjected to the aforementioned squeezing in conjunction with their forward advance by the belts 40, 42, FIG. 3, and in so doing to be deformed each into forward edge engagement, as distinguished from flat end engagement, with the under face of the film F. This corner or edge engagement, under the influence of the biasing or self-restoring tendency of the rubber gripper material, will be understood to provide an engagement or seizure which is much more firm or secure than the wide-area or plane-surface engagement which obtains between the upper surface of the film F and the under faces of plate 24 or of the upper guide plates 26, 30 against which the film is pressed by the grippers 60, and along which it is thereby enabled to advance.

In pulling the film F, the grippers 60 will be understood normally to have continuous advance, as initiated by the starting of the drive motor 54, and more particularly to come gradually into engagement with the underside of film F upon their travel up the inclined ends of lower guides 28, 32. The lengths of the channels 34, 36 and more particularly of the belts 40, 42 will be such as to enable the grippers 60 to draw or pull the leading edge of the film F past the cutting station a distance at least equal to the longest length of sheet or strip which it is desired to cut from the continuous supply, or roll. At this point suitable means are provided for disengaging or releasing the grippers 60 from the severed strip said means herein comprising the downward, pressure reducing inclines or depressions in guides 28, 32 located at selected locations along those guides or, as herein disclosed, at the ends thereof, down which inclines the grippers may travel thereby to pull away from and stop the forward advance of the severed strip. The underlying or center support plate 38 supports the following or unengaged ends of the moving severed strips and is seen to terminate short of the end of the belt run whereby the strips may be engaged by packaging or delivering or other means forming no part of the invention and therefore not shown.

If desired, means may be provided for automatically stopping the continuous film advance upon the delivery of each severed strip as where that is to a subsequent station or operation in which the film is handled more slowly than, or at a rate non-uniform with its cutting and severing by the invention apparatus. For such purpose any convenient control device such as a microswitch can be utilized to deenergize the motor 54 whenever a set of grippers 60 has pulled the leading edge of a severed section to the limit or end of its run.

Figure 5:
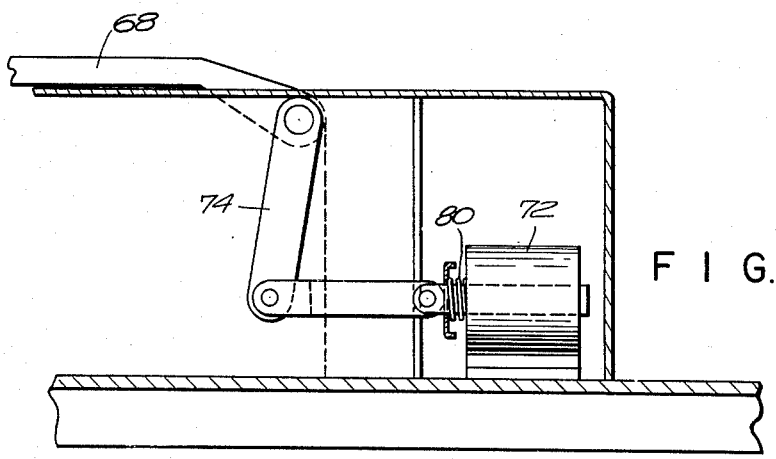
FIG. 5 is a vertical section along the line 5—5 of FIG. 1.

The invention means for cutting the film are shown in FIGS. 1 and 2 and more particularly in FIGS. 3 and 5 to comprise a blade or knife 66 supported at its ends on arms 68 carried by and for rotation with a shaft 70 supported through the side plates 18, 20, and by whose movement the knife is shifted up and down in the aforementioned gap between our guide means 24 and upper guide plates 26, 30. The shaft 70 may be turned in any convenient manner, as herein by a solenoid 72 reciprocating a link 74 which is keyed to the shaft 70. Limit stops may be provided as necessary or desired to halt the upward and downward stroke of the knife 66, the downward movement thereof being understood to be to a point below the level of the under face of upper guide plates 26, 30 and above the level of the belts 40, 42.

The solenoid 72 may be actuated for driving the knife 66 in any convenient manner, as herein by a photocell 76, FIG. 2, for the beam interruption of which the film F may be printed with opaque spots or indices 78, FIG. 1 positioned laterally to pass under the photocell and longitudinally at desired strip lengths.

For a rapid, sure cut or stroke the solenoid may be provided with a conventional outwardly biasing or return spring 80, FIG. 5.

Further in accordance with the invention, the cutter means or knife 66 is provided with a scalloped or wavy line edge 82, FIG. 3. By this novel configuration, the cutting means hereof is given an action of a substantially different nature than that of the conventional straight line cutting blade, whose action upon its impact normal to or sidewise of and simultaneously across the full width of the film would be wholly that of tearing or forcing apart the plastic film. With the invention cutter on the other hand, the contact with the film is made first at the high points of the scalloped edge 82 which are required to accomplish all at once a shearing of only a small part of the width of the film. There is then had a lateral widening and running together of, or what I call slitting of, the high point cuts by a process of slicing as distinguished from the mere shearing or tearing of the film. With the serrated edge cutter of this invention, then, there is accomplished a clean, quick severing of the polyethylene or similar films.

It will be understood therefore that the instant apparatus is effective to sever the thin films here concerned by reason of an improved cutting action as well as by the hereinbefore mentioned tensioning of the film.

A further feature of the invention is that it turns to advantage the electrostatic or attractive forces experienced with the films here concerned. More particularly, the accumulation of the electrostatic charges thereon will pull the film upwardly against the overlying plate 24 at one side of the cutter gap and downwardly against the supporting plate 38 at the other side thereof thereby enhancing the tightening of the film at the cutter gap as caused by the aforementioned pulling by the grippers 60 against the retarding force of the brake 10. The electrostatic forces will be understood also to cause a tensioning of the film even after it is severed. More particularly, there is had a smoothing out and flattening of the cut film length on the plate 38, as it is pulled along the plate surface by grippers 60, on the travel of said length to the exit end of the machine, and whereby it is delivered there in a substantially unwrinkled condition. In this, the electrostatic attraction between the severed film and the plate 38 produces forces tending to adhere and so retard successive portions of the film as they pass over plate 38, thereby in effect ironing out or flattening to the rear any wrinkles as may have been impressed or induced in the moving film during its manufacture or delivery. Accordingly, plate 38 is preferably constructed of a dielectric material such as is particularly attracted to, and with an area sufficient to produce a considerable braking action on film F.

A further advantage by the electrostatic forces to the operation of the invention apparatus is that, following actuation of the cutting means said forces tend to adhere the new leading edge of the uncut film to the underside of plate 24 in readiness for the engaging and pulling of the film by oncoming grippers 60.

It will be appreciated that one or both of the side plate or box assemblies 18, 20 and the parts supported thereon, may be mounted for sidewise or opening and closing movement as may be necessary or desired to accommodate different film widths. The adjustment in any given instance will of course be to bring the belts 40, 42 and their grippers 60 under the side margins or edges of the film. And if it is desired to dispense film in the form of a very narrow strip or tape such as could not properly fit between plate assemblies 18, 20 even as in the fully closed position, it is apparent that one only of the assemblies such as that at 20 may be used to dispense this strip, with the other being opened away or removed entirely.

In any given application of the invention apparatus, it will be appreciated that the lengthwise distribution of the grippers 60 is related to the lengthwise spacing of the opaque spots 78 or the time interval of other cutter control means so as to preclude any gripper 60 being under cutter 66 when that actuates. It will be appreciated further that the most rapid dispensing of severed strips for a given belt speed occurs when the cutter control means and the lengthwise spacing between grippers 60 are adjusted to cause a set of grippers 60, 60 to engage the new leading edge of film F at plate 24 immediately following an actuation of cutter 66. But if it is desired to provide spaced delivering of these individual severed sheets or strips, this may also be accomplished in the illustrated embodiment by merely increasing the lengthwise spacing between grippers 60 such as, for example, by removing alternate ones of the same. Also within the scope of the invention, cutter 66 and plates 24, 38 may be modified to adapt the instant device for dispensing these film lengths with zig-zig, rounded, scalloped, diagonal or other leading and trailing edge shapes.

I claim as my invention:

1. The method of dispensing lengths of relatively wide flexible film from a continuous strip supply comprising the steps of mounting the supply for advance of the strip along a relatively long track, compressively engaging from both sides the leading edge only of said strip supply at one point on said track, drawing the engaging means and thereby said leading edge to another point on said track remote from said first point, passing a severing means through the plane of said film across the full width of said film while said film is advancing and at a point intermediate said one and other points on said track whereby said leading edge is separated from and advances away from said continuous supply, and releasing said edge at said other track point.

2. The method of dispensing lengths of flexible film from a supply comprising engaging a leading edge of said film supply at a first location, drawing said leading edge along a predetermined path toward a second location, cutting said film during said drawing and intermediate said locations whereby to sever a desired length from said continuous supply, electrostatically retarding the trailing portions of and thereby flattening said moving severed film length, and delivering said severed length at said second location.

3. Apparatus for dispensing lengths of flexible film from a continuous supply comprising means providing a track along which to advance said film from one end, means for compressively engaging from both sides the leading edge only of the film at one point in its said advance, means for drawing said engaging means and thereby said film along towards another point on said track, film cutting means disposed intermediate said points on and adjacent to said track for effecting a cutting of said film while said film is advancing, whereby said severed film portion separates from and advances away from said continuous supply.

4. Apparatus for dispensing lengths of flexible film as defined in claim 3 wherein said film engaging means comprises one or more resilient grippers whose film engaging surface consists of a multiplicity of small upstanding segments adapted for non-slip engagement with said film edge.

5. Apparatus for dispensing flexible film sections comprising a continuous track, a continuous film supply at one end of said track, spaced grippers adjacent said track, means at one point on said track for compressively engaging the leading edge only of said film supply between said grippers and said track, means for drawing said film grippers and thereby said edge along to another point on said track, means at said other end of said track for disengaging said grippers from said film edge, and means intermediate said two track points adjacent to said track for effecting a transverse cutting of said film at a determined distance from said leading edge whereby said leading edge separates from and moves away from said continuous supply.

6. Apparatus for dispensing lengths of flexible film from a supply comprising means providing a track along which to advance said film from one end, means for gripping the leading edge only of the film by compressive engagement from both sides at one point on said track, means for pulling said gripping means and thereby said film towards another point on said track, film cutting means disposed intermediate said points on and adjacent to said track, means for actuating said cutting means during said film advance whereby to sever a length of said film from said supply, and means disposed adjacent the path of said film and over which said film advances for retarding trailing portions of and said severed film whereby said severed film is flattened and delivers to the other track end in substantially unwrinkled condition.

7. In an apparatus for dispensing lengths of flexible film, parallel spaced guide means, said guide means being arranged parallel to the side edges of said film, means for providing a continuous film supply between said guide means at one end thereof, gripping means movable along and between one of said guide means and said film, said gripping means being pressed by said one of said guide means into engagement with the leading edge of said film at one point on said guide means whereby to squeeze said film between said gripping means and the other of said guide means, means for pulling said gripping means and thereby said film along between said guide means to another point on said guide means beyond said first point, and means intermediate said two points for effecting a transverse cutting of said film, said one of said guide means being adapated to relieve the pressure on said gripping means beyond said cutting means whereby said gripping means are disengaged from said film.

8. An apparatus for dispensing lengths of flexible film as defined in claim 7 and means intermediate said two points for braking the trailing portions of and thereby tensioning said film.

References Cited by the Examiner

UNITED STATES PATENTS

| | | | |
|---|---|---|---|
| 925,096 | 6/09 | Hardy | 83—325 |
| 1,025,490 | 5/12 | Tcherene | 83—435 |
| 1,462,871 | 7/23 | Rosenberg | 83—449 |
| 1,478,998 | 1/24 | Howard et al. | 83—325 |
| 1,620,546 | 3/27 | Grover | 83—325 X |
| 2,040,775 | 5/36 | Lorig | 242—75.41 |
| 2,356,841 | 8/44 | Gregory | 83—371 |
| 2,574,674 | 11/51 | Walker | 226—171 |
| 2,711,792 | 6/55 | McFall | 83—355 |
| 2,792,887 | 5/57 | Middelhof | 83—596 X |
| 2,895,552 | 7/59 | Pomper et al. | 83—94 X |
| 2,996,982 | 8/61 | Alm | 83—151 |
| 3,013,367 | 12/61 | La Sarre | 83—355 X |
| 3,039,713 | 6/62 | Nye | 83—335 X |
| 3,055,266 | 9/62 | Frantz et al. | 83—112 X |

ANDREW R. JUHASZ, *Primary Examiner.*

EDWARD C. ALLEN, *Examiner.*